Patented Mar. 11, 1930

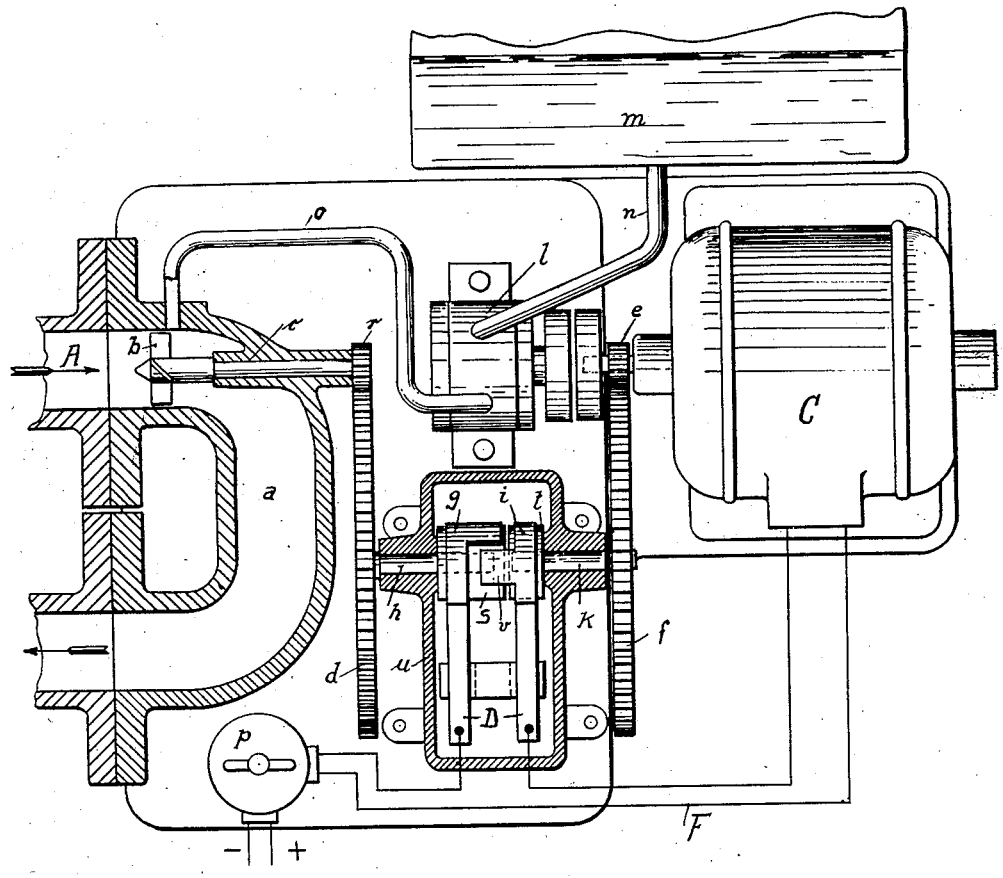

1,749,811

UNITED STATES PATENT OFFICE

HANS GROECK AND FRANZ JORDAN, OF BERLIN, GERMANY, ASSIGNORS TO GROECK WASSERVEREDLUNG G. M. B. H., OF BERLIN

METHOD AND APPARATUS FOR MIXING FLOWING MEDIA IN EQUAL PROPORTIONS

Application filed March 8, 1928, Serial No. 260,210, and in Germany March 11, 1927.

The treatment of waters for consumption and service and of gases, the production of chemical products in large quantities, the dressing of organic and inorganic substances in breweries, dye-factories and the like require a simple mixing-device which operates positively and securely. The commonly used mixing devices are unpractical owing to their defects. They fail frequently, when liquids, gases, floury or granular materials have to be mixed in a predetermined but always equal proportion to which however fluctuating quantities have to be added, and specially when in a pipe-conduit small quantities of additional substances, for instance in the proportion 1 by 1000 have to be added. It has already been proposed, to operate, from a vane-wheel driven by the flow of main material, a device which supplies additional quantities to this flowing medium. It has further been proposed to insert water-motors in the water main for obtaining a mixture in equal proportions, said water-motors comprising suction- and pressure-pumps. Such installations must fail in practical service, as the driving of the flowing medium is not sufficient to overcome the resistances in each water-motor produced by friction, packings and leakages and the like. Also the water-pressure, which frequently varies, and the drop of pressure produced in the machine influence unfavourably such installations up to complete failing. It has also become known to control a motor by the flowing medium for positive mixing in equal proportions.

At the solution of the problem it has to be considered, that the difficulty in the obtention of a mixing relation of permanently equal proportions consists in the irregular supply of the main liquid or in the fluctuating pressure in the water-main and in the inequality of passage-flow. The additional quantities must adapt themselves to these fluctuations of the main flow. It is not necessary to utilize the force of the flow for the operation of the mixing devices, as any other driving force may be used for this purpose.

According to the invention a switch element is operated by a control-element influenced by the main flow, which adjusts through the intermediary of a motor the allotting-device and interrupts the starting automatically after the adjusting. The travel of the motor is thereby brought into an equal relation to the path over which the control-element has travelled and it is ensured that to the main flow, driving the control-element, addition-means are added in permanently equal relation. As control-element a vane-wheel or a reciprocating piston or the like may be used.

The arrangement for carrying out the mixing method may be made so that the control-element, for instance a vane-wheel, drives a contact-disc which is positively connected with another contact-disc, connected to the pump-motor, so that this pump-motor adapts its speed positively to the speed of the vane-wheel.

For carrying out the method an electrically operated armature (solenoid) might be used instead of an electromotor. In this case the rotating contact-discs would be omitted, and on the shaft driven by the control-element only one single disc would be mounted, having corresponding abutments. By means of these abutments current-impulses would be communicated by circuit-closing to the electrically operated armature, said impulses depending on the revolving speed of the control-element.

An installation for carrying out the method is shown, by way of example, in the only figure of the accompanying drawing, partly in section and partly in elevation.

The passage-medium flows through the pipe-conduit $a$ in the direction of the arrow A and in the pipe-conduit a vane-wheel $b$ is arranged, on the shaft $c$ of which a pinion $r$ is keyed which gears with a transmission-wheel $d$. This wheel $d$ is keyed on a shaft $h$ journalled in a casing $u$ and carrying a cylinder $s$ of insulating material. On the cylinder $s$ a contact-disc $g$ is fixed. Opposite the cylinders $s$, separated from the same but in the same axial direction, a cylinder $t$, also of insulating material, is keyed on a shaft $k$ journalled in the casing $u$. On this cylinder $t$ a contact-plate $i$ is fixed, contact-flaps $v$ of which grip over the cylinder $s$. Against the contact-discs $g$ and $i$ bear sliding contacts D. On the outer end of shaft $k$ a transmission-wheel $f$ is keyed which meshes with a pinion $e$ keyed on the shaft of an electromotor C. On the motor-shaft a suction and pressure-pump $l$ is mounted from which a suction-pipe $n$ leads to the reservoir $m$ for the medium to be admixed, and a pressure-pipe $o$ to the conduit-pipe $a$. The point at which the pressure-pipe $o$ taps in the conduit $a$ is preferably in front of the vane-wheel $b$, so that, by the rotating movement of this vane-wheel, an intimate mixing is ensured. The electric-wire F connected to the sliding contact B and with the motor C is adapted to be switched in or out by a switch $p$. For the pump a raising apparatus or any other supply-device may be substituted.

The operation is as follows:—

The liquid flowing, in the direction A, through the pipe-conduit $a$ drives the vane-wheel $b$ the motion of which is transmitted by pinion $r$, spur-wheel $d$ and shaft $b$ upon the cylinder $s$, carrying the contact-disc $g$. A condition for the operation is, that the maximum revolving speed of the motor C is at least equal or higher than the revolving speed of the vane-wheel $b$ at the maximum quantity of medium passing through the conduit $a$.

The contact-disc of cylinder $s$ comes in contact with the contact-disc $i$ of the cylinder $t$ so that the motor-circuit is closed and the motor C is started. When the revolving speeds of the motor C and of the vane-wheel $b$ are equal, the two contact-discs rotate synchronously, when the full quantity of medium is flowing through the conduit $a$, the circuit remaining closed. It can be interrupted only, when either the cylinder $s$ is stopped, when the water-flow is interrupted or, when it retards for the reason that the speed of flow is reduced owing to a variation of pressure. In both cases the contact-disc of the cylinder $i$ will stop, owing to the running down of the motor and remain at a certain distance from the contact-disc of cylinder $s$. The operation consists therefore in that either at equal revolving speed of motor C and vane-wheel $b$ or at higher revolving speed of motor C at the maximum passage of medium (or at reduced velocity of flow in any case) the cylinder $t$ moves ahead, the cylinder $s$ making up gradually for this moving ahead. The motor will therefore always be started again by the vane-wheel. To a certain rotation of the vane-wheel, depending on the flowing medium, the rotation of the mixing mechanism will carry out a proportional rotation, being a measure for the admixing.

The proportion of main liquid and additional liquid must therefore remain always the same.

It will become necessary to frequently alter the ratio of addition, for instance with water for consumption in which the constituents dissolved in the same vary sometimes every day. A mixing device fulfilling all requirements must therefore be easy to regulate.

The device described fulfills this condition, as it can be regulated in most various manners, for example by altering the transmission between the vane-wheel-shaft and contact-cylinder or between the motor and contact-cylinder and between motor and pump. The revolving speed of the motor may further be altered by braking, resistances or the like.

We claim:—

1. An apparatus for positively mixing always in the same relation two media one of which controls a motor determining the quantity of the second medium, comprising in combination with a motor having a starting circuit and with a conduit for the principal medium, a vane wheel in said conduit, and a switch mechanism in said starting circuit adapted to produce the proportionality between said vane wheel and said motor said switch mechanism being opened after the closing of the circuit either by said motor or by said vane wheel influenced by said principal medium.

2. An apparatus as specified in claim 1, comprising in combination with the liquid conduit for the principal medium a vane-wheel in and driven by said liquid, an electric motor for feeding chemical into said liquid, a contact-disc driven by said vane-wheel, and a contact disc driven by said electric motor so that said electric motor connected to said second contact disc is positively driven at the revolving speed of said vane-wheel.

In testimony whereof we affix our signatures.

HANS GROECK.
FRANZ JORDAN.